(12) United States Patent
Cottrell et al.

(10) Patent No.: US 6,639,006 B1
(45) Date of Patent: Oct. 28, 2003

(54) COMPOSITION BASED ON CROSS-LINKABLE, WATER-DISSIPATABLE ACRYLIC POLYMERS, PROCESS AND USE

(75) Inventors: David Cottrell, Manchester (GB); David Alan Pears, Manchester (GB); John Christopher Padget, Frodsham (GB); Neil Anthony Tallant, Manchester (GB); Stephen George Yeates, Manchester (GB)

(73) Assignee: Avecia Limited, Blackley (GB)

( * ) Notice: Subject to any disclaimer, the term of this patent is extended or adjusted under 35 U.S.C. 154(b) by 0 days.

(21) Appl. No.: 09/806,759

(22) PCT Filed: Sep. 8, 1999

(86) PCT No.: PCT/GB99/02989

§ 371 (c)(1),
(2), (4) Date: Apr. 3, 2001

(87) PCT Pub. No.: WO00/29493

PCT Pub. Date: May 25, 2000

(30) Foreign Application Priority Data

Nov. 12, 1998 (GB) .............................................. 9824818

(51) Int. Cl.$^7$ .......................... C08L 33/02; C08L 33/08; C08L 33/10; C09D 11/10; G02B 5/20
(52) U.S. Cl. ........................ 524/556; 524/560; 523/160; 430/7
(58) Field of Search ................................ 523/160, 161; 524/556, 560; 522/65, 68; 430/7, 20

(56) References Cited

U.S. PATENT DOCUMENTS

| 3,923,453 A | * | 12/1975 | Lazar et al. .................... 8/611 |
| 5,482,545 A | * | 1/1996 | Aoki et al. ............... 106/31.43 |
| 5,677,385 A | * | 10/1997 | Miyake et al. .............. 525/286 |
| 6,020,405 A | * | 2/2000 | Matzinger et al. ............ 524/31 |
| 6,040,108 A | * | 3/2000 | Schadeli et al. ............. 430/200 |
| 6,084,006 A | * | 7/2000 | Kashiwazaki et al. ....... 523/160 |
| 6,180,294 B1 | * | 1/2001 | Shiba et al. .................... 430/7 |
| 6,211,265 B1 | * | 4/2001 | Ohta et al. .................. 523/160 |
| 6,221,543 B1 | * | 4/2001 | Guehler et al. ................. 430/7 |
| 6,255,034 B1 | * | 7/2001 | Shimada et al. .......... 430/281.1 |

FOREIGN PATENT DOCUMENTS

| EP | 0591916 | 4/1994 |
| EP | 0616017 | 9/1994 |
| EP | 0 703 471 | 3/1996 |
| EP | 0784085 | 7/1997 |
| EP | 825239 A2 * | 2/1998 |
| FR | 2 728 078 | 6/1996 |
| JP | 9090115 A | 9/1995 |
| JP | 9157563 A | 12/1995 |
| JP | 8311383 | 11/1996 |
| JP | 8333537 | 12/1996 |
| JP | 9095617 | 4/1997 |
| JP | 9132740 | 5/1997 |
| JP | 9165541 | 6/1997 |
| WO | WO 95/34024 | 12/1995 |

* cited by examiner

*Primary Examiner*—Callie Shosho
(74) *Attorney, Agent, or Firm*—Pillsbury Winthrop LLP

(57) ABSTRACT

A process for preparing a patterned, cross-linked, acrylic-polymer, film coating on a substrate; the process comprising the steps of: a) applying to the substrate by an ink-jet printing process a mixture comprising: i) one or more cross-linkable, thermally ink-jettable, water-dissipatable, precursor(s) for one or more cross-linked acrylic-polymer (s); ii) one or more cross-linker(s) capable of cross-linking the precursor(s) for the acrylic-polymer(s); and iii) one or more colorant(s); and b) thereafter curing the mixture in situ to form the patterned, cross-linked, acrylic-polymer, film coating on the substrate. Preferably the substrate is a color filter suitable for use in an LCD display and the mixture is applied in a single pass. The precursor may itself comprise polymers, e.g. acrylic polymers. Ink for use in this process and substrates printed by this process are also described.

37 Claims, No Drawings

COMPOSITION BASED ON CROSS-LINKABLE, WATER-DISSIPATABLE ACRYLIC POLYMERS, PROCESS AND USE

This application is the National Phase of International Application PCT/GB99/02989 filed Sep. 8, 1999 which designated the U.S. and that International Application was published under PCT Article 21(2) in English.

This invention relates to inks comprising acrylic polymers; to their use in ink jet printing to prepare patterned substrates (e.g. colour filters); and patterned substrates prepared by this method.

Ink jet printing (IJP) methods involve a non-impact printing technique for printing an image onto a substrate using ink droplets ejected through a fine nozzle onto a substrate without bringing the nozzle into contact with the substrate.

The ability to produce a patterned polymeric coating on a substrate, where the coating has high resistance (fastness) to solvents, water and heat is important in many areas of for instance the electronics and printing industries. IJP is a convenient method of producing such patterns in a precise and rapid manner. In this process, inks containing precursors for cross-linked acrylic polymer(s) are applied to the substrate to produce a continuous film, and the substrate is subsequently treated in order to produce a cross-linking reaction within the film to give a coating with the requisite fastness properties. The use of IJP, particularly thermal IJP, does however impose significant demands on the precursors used to produce such patterns, as they must be chosen such that they are able to produce inks of low viscosity and high stability, and yet are sufficiently reactive to produce the high fastness properties needed once they are applied to the substrate.

There are many demanding performance requirements for colorants and inks used in IJP. For example, they desirably provide sharp images having good water-fastness, light-fastness and optical density. The inks are often required to dry quickly when applied to a substrate, but they should not form a crust over the tip of an ink jet nozzle because this will stop the printer from working. The inks should also be stable to storage over time without decomposing or forming a precipitate which could block the fine nozzle. The most popular ink jet printers are the thermal and piezoelectric ink jet printers. There is a need for inks which are suitable for both thermal and piezo ink jet printers, have high colour strength and produce images having a high light-fastness and water-fastness when printed on a substrate.

Colour filters, alternatively known as optical filters, are a component of coloured liquid crystal displays (LCDs) used as flat screen displays as, for example, in small television receivers or portable computers. Typically, a white backlight is shone through a liquid crystal layer and then a colour filter to produce an image of the desired colour by the transmitted light. The LCD layer comprises an addressable array of pixels. The light at any pixel can be switched on and off by applying a voltage to the liquid crystal film which changes the orientation of the polarising liquid crystals to block the back-light. The pixels are in register with a trichromatic array of colour filter elements to produce a full colour screen capable of displaying images. Some LCD displays are constructed to be viewed by reflected light, but still require a colour filter to produce a full colour image. Colour filters are equally useful for other display technologies such as plasma display panels, cathode ray tubes and electroluminescent displays and as a component of solid state imaging devices. It is advantageous that the coloured elements of a colour filter are formed by a printing process such as IJP. Compared to other methods (e.g. etching or photolithography) the wastage of colorant is much less and the manufacturing steps are reduced, leading to a simpler and cheaper process.

For the IJP of colour filters it is important to maximise the solids content of the ink formulation to enhance film quality and minimise the number of processing steps. This must be achieved whilst maintaining low ink viscosity. It is particularly preferable to be able to achieve sufficiently high solids loadings in the ink to allow the deposition of enough material on to the substrate to produce the desired properties in a single pass of the ink-jet head. It is also important that the colour filter is resistant to solvents, water, heat and light. Such resistance can be achieved by cross-linking polymeric components using a thermal cross-linking reaction. It is vital that cross-linking reactions employed do not take place in the print head if a thermal IJP method is to be used.

Certain photosensitive acrylic resins have previously been used to produce colour filters by photolithography, which, as mentioned above, is a wasteful and complicated process. Much of the colorant that is applied to the substrate is removed in later process steps. These photosensitive acrylic resins are not applied by IJP, and are unsuitable for such a process, particularly in the demanding conditions experienced in a thermal ink-jet print head.

WO 95-034024 (Zeneca) (=EP 0764290) discloses a method for producing a colour filter by IJP a precursor for a polymer and a resin reactive dye so that the dye is covalently attached to the cross-linked polymer matrix on the substrate surface. The polymeric inks disclosed in this reference are not especially optimised for being fired in a thermal ink-jet print head, whereas the acrylic polymers used in the present invention are optimised to be thermally ink-jettable. Thus for example certain inks disclosed in WO 95-034024 may comprise too much melamine-formaldehyde resin cross-linker to be fired from a thermal IJ print head (see Comparative Example A, herein). The present invention does not require use of a resin-reactive colorant, where the colorant is chemically bound to the cross-linked polymer. Thus the present invention may use colorants incompatible with those described in WO 95-034024 which thus teaches away from the present invention. The ability to use dyes which are not covalently bound to the polymer greatly increases the flexibility in the choice of colorant used.

JP-A-08-311383 (Canon) describes the use of an alkali soluble styrene-acrylic acid co-polymer as a pigment dispersant for a thermal ink-jet ink. Although this ink uses ethanolamine as a base, this would not be a particularly effective cross-linker. This document does not suggest to cross-link the resin or to try to form a continuous film, both of which are important when making a colour filter.

JP-A-09-157563 (Kao Corp.) describes an ink which has good operability in a thermal ink-jet head and contains a carboxylic acid containing polymer such as poly(ethylene-co-acrylic acid). It is believed that the polymer is present to improve the water resistance of the dye. As with the previous Canon reference, this document does not teach to cross-link the acrylic polymer or form a continuous film.

EP-A-0703471 (Canon) describes a method for producing colour filters by IJP an acrylic polymer as an ink-receiving layer. This requires applying the polymer and colorant in two separate stages, whereas in the present invention only one processing step is required to apply both colorant and polymer.

JP-A-09-090115 (Toray Ind.) discloses an ink containing a pigment, styrene-acrylic acid polymer and melamine-formaldehyde resin to form a colour filter using an IJP process. The applicant has found that melamine-formaldehyde resins give poor operability in a thermal ink-jet head. The inks described in the present invention also allow the use of dyes as colorants to give filters with particularly good spectral properties.

JP-A-09-132740 (Asahi Glass) describes the use of a resin and pigment ink for making colour filters by ink-jet, but the inks contain mixtures of colloidal silica and water dispersible resins which will not fire efficiently through a thermal print head at the high loadings required to produce a durable colour filter in a single pass.

JP-A-09-165541 (Kao Corp.) is similar to the previous Kao patent, but uses polymers which are cross-linked by UV and solubilised with styrene sulphonic acid comonomer. These inks are not used to form continuous films and are not thermally cured. Thermal curing is advantageous compared to the alternatives such as UV-curing, as thermal curing can be a non-radical process and generally less harmful to the dyes.

JP-A-08-333537 (Canon) describes a 'thermoreversible thickening polymer' which is used as a wet fastness additive. This polymer is stated to cross-link on drying to give a water resistant film. From the examples, this appears to involve nucleophile/electrophile chemistry, with a ring —NH group as the nucleophile and an epoxide as the electrophile. The example given has a $M_w$ of 200,000, which is much higher than the preferred $M_w$ values of polymeric precursors used in the present invention. The polymer is used at only 3% total resin loading so it would not form an effective colour filter. It is unlikely that such a polymeric system would be thermally ink-jettable at the high solids loadings needed in inks to form colour filters in a single pass process.

EP 0591916 (MAN Roland Druckmasch) describes a composition used for making offset printing plates, involving ink-jetting a cross-linkable polymer system formed by reacting a polyol with a poly carboxylic anhydride (e.g. poly(styrene-co-maleic anhydride) and PVA. All the examples use no more than about 3% total resin loading in the inks, which is incompatible with a single pass process for colour filters where higher resin loadings are generally required (often above 10%). The MAN compositions do not contain a separate colorant. All the cross-linkers used in MAN are polymeric which the applicant has found are not preferred in the process of the present invention as they do not readily thermally ink-jet.

The prior art polymeric inks are not cross-linked to form colour filters; are not reliably ink-jettable, especially not in a thermal ink-jet printer; and/or are incapable producing a durable coating of a cross-linked acrylic-polymer film, especially in a single pass IJP process. There is no disclosure in the prior art of an, optionally polymeric, ink of good operability which may be reliably and economically applied, optionally in a single pass, to a patterned substrate by an ink-jet printing process, optionally thermal IJP, to produce after curing, optionally thermally, a coating of a resistant, patterned, coloured, cross-linked, acrylic-polymer film, optionally a colour filter.

It is an object of the present invention to provide improved processes for forming film coatings, that overcome some or all of the disadvantages of the prior art as discussed above.

Surprisingly the applicant has found that inks containing one or more precursor(s) for cross-linked acrylic polymer(s), cross-linking agent(s) and colorant(s) are particularly suitable for making colour filters by a printing process, optionally IJP, particularly thermal IJP. Although these inks offer particular advantages when used in a thermal ink-jet head, they are also suitable for use in piezoelectric IJP and offer improved reliability over the prior art for this technology.

According to a first aspect of the present invention, there is provided a process for preparing a patterned, cross-linked, acrylic-polymer, film coating on a substrate; the processing comprising the steps of:

a) applying to the substrate by an ink-jet printing process, optionally in a single pass, a mixture comprising:
  i) one or more cross-linkable, thermally ink-jettable, water-dissipatable precursor(s) for one or more cross-linked acrylic-polymer(s);
  ii) one or more cross-linker(s) capable of cross-linking the precursor(s) for the acrylic-polymer(s); and
  iii) one or more colorant(s); and
b) thereafter curing the mixture in situ, to form the patterned, cross-linked, acrylic-polymer, film coating on the substrate.

Preferably the ink-jet printing process is thermal IJP.

Preferably the precursor(s) for the cross-linked acrylic-polymer(s) is present in the mixture in a total amount greater than about 4%.

The mixture comprises a total solids content which is both sufficiently high enough to form, after curing, the film coating after the single pass IJP process, yet is sufficiently low enough so the mixture is still readily printable using IJP (preferably thermal IJP). Conveniently, the total solids content of the mixture is from about 4% to about 50% by weight. Optionally the solids content consists substantially of the (optionally polymeric) precursor(s).

Preferably the precursor has a weight average molecular weight ($M_w$) less than 200,000.

Preferably the cross-linker has a weight average molecular weight ($M_w$) less than 10,000, more preferably are non-polymeric.

Preferably the cross-linker is other than ethanolamine, more preferably is other than ethanolamine, epoxy and/or melamine-formaldehyde resin.

Preferably the mixture is capable of being thermally cured after IJP.

Preferably the film coating is substantially continuous.

Preferably the mixture to be printed has a good operability, effectiveness and/or reliability in an IJ (preferably thermal IJ) print head.

Preferably the process uses most (more preferably substantially all) of the mixture that is applied to form the final film coating, i.e. the process is not excessively wasteful of material.

Preferably the mixture comprises less than about 4% by weight, more preferably is substantially free of, melamine-formaldehyde resin.

The film coating may be either a colour filter comprising a coloured, cross-linked, acrylic-polymer, film coating on a transparent substrate; or a transparent coloured; cross-linked acrylic-polymer, film coating on a substrate.

In the above process inks are applied, preferably in a single pass, to a substrate by an ink-jet printing process and cured, preferably thermally, to give a colour filter matrix with high transparency and very good solvent, water, heat and light resistance. Optionally a colour filter comprises red, green and blue filter elements. Each of the coloured inks used to form each colour component of the resultant film (e.g. a colour trichromat and black) may be applied to the substrate in a single pass for each colour. Optionally all of the inks used to form the final coloured film may be applied simultaneously to the substrate by a multi headed IJ printer (optionally in different patterns) so that a durable, resistant full-colour film can be formed on the substrate in a single pass.

Unlike the prior art, the inks used in the above process have good operability in an ink-jet head (especially a thermal ink-jet head) even at relatively high solids loadings. Although polymers have been disclosed in the prior art for use in thermal ink-jet inks as dispersants and wet-fastness improving additives amongst others, the prior art does not disclose the use of precursors for cross-linked acrylic polymers in thermal IJ inks in conjunction with a cross-linker and at high solids loadings. The inks used in the present invention give highly resistant film coatings. The precursor(s) may themselves be polymeric, comprising one or more polymer(s), preferably one or more acrylic polymer(s).

The above process could equally be applied to any application where a cross-linked film needs to be applied to a substrate in a precise pattern and is not limited to the production of coloured films, as the colorant could be omitted. This could potentially be seen as an alternative technology to photolithography, for production of printed circuit boards, offset printing plates and other similar processes. Other possible uses for a process for applying films of the present invention which are coloured includes processes for coating vehicles (e.g. cars).

The thermally ink-jettable, water-dissipatable precursor(s) for the acrylic-polymer(s) have preferably been obtained from the polymerisation of one or more olefinically unsaturated monomer(s) having water dispersing groups, optionally in the presence of one or more olefinically unsaturated monomer(s) which are free from water dispersing group(s). Preferably the water-dissipatable precursor(s) are hydrophilic.

The precursor(s) may comprise one or more olefinically unsaturated, water-dissipatable monomer(s) (e.g. acrylic acid) and/or one or more polymer(s) derivable from one or more olefinically unsaturated, water-dissipatable monomer(s), such monomer(s) and/or polymer(s) preferably being present in amount from about 20% to about 100% by weight of the precursor(s).

Preferably the number average molecular weight ($M_n$) of those precursor(s) (and/or components thereof) which are polymeric is less than about 20,000, more preferably from about 200 to about 20,000; most preferably from about 200 to about 10,000; and especially from about 350 to about 2,000. The $M_n$ of such precursor(s) may be measured by gel permeation chromatography ("GPC").

The GPC method used for determining $M_n$ preferably comprises applying a polymer to a chromatography column packed with cross-linked polystyrene/divinyl benzene, eluting the column with tetrahydrofuran at a temperature of 40° C. and assessing the $M_n$ of the polymer compared to a number of a polystyrene standards of a known $M_n$. Suitable cross-linked polystyrene/divinyl benzene chromatography columns are commercially available from Polymer Laboratories.

If the GPC method for determining $M_n$ does not work for any reason, for example the polymer has an unexpected interaction with the GPC column to give an unrealistic result, the $M_n$ may be determined using alternative methods, for example by vapour phase osmometry.

The precursor(s) preferably has an acid value of from 0 to 1000 mgKOH/g, more preferably 100 to 850 mgKOH/g.

Optimisation of both molecular weight and acid content are important to achieve operability of the precursor(s) in a thermal IJ head.

It is also optional that the precursor(s) comprises a mixture of different polymers as this may help reduce the presence of defects such as pinholes in the polymer film produced by the process of the present invention.

The precursor for the cross-linked acrylic-polymer used in the present invention comprises any thermally ink-jettable and water-dissipatable moiety which is capable of being polymerised to form an acrylic polymer. The precursor(s) may itself comprise monomeric, oligomeric and/or polymeric components and/or mixtures thereof. The precursor may be a single component or a mixture. Preferably the precursor comprises hydrocarbyl and/or heterocarbyl chains (preferably $C_2$–$C_{150}$alkyl) which are substituted by one or more acid functional group(s) preferably selected from carboxy, carboxy substituted alkyl and carboxy substituted aryl. Such groups can be chain pendant and/or terminal. The precursor(s) for the cross-linked acrylic polymer(s) may itself optionally comprise one or more acrylic polymer(s), preferably acrylic polymer(s) of low molecular weight (e.g. $M_n$ less than about 20,000).

Preferably the precursor is selected from one or more of: homopolymers of (meth)acrylic acid, vinyl acetic acid, crotonic acid, itaconic acid, maleic acid, citraconic acid, fumaric acid or 2,4-pentadienoic acid; co-polymers of these monomers with each other or with other monomers (for example one or more selected from alkyl [meth]acrylates and styrene); and monomeric poly carboxylic acids (for example butane 1,2,3,4-tetracarboxylic acid).

The cross-linker preferably comprises a poly-nucleophile functionalised compound (e.g. a di- or poly-alcohol), amine or thiol. More preferably the cross-linker is selected from one or more diol(s); polyol(s) comprising three or more hydroxy groups (for example that available commercially from EMS Chemie under the trade name Primid XL552); trimethylolpropane; and triethanolamine. A less preferred cross-linker comprises poly(vinyl alcohol) [PVA] which gives a resultant polymer with good fastness properties, but tends to cross-link too extensively, making it difficult to find dyes which are compatible with the resultant polymer matrix. Polyamines may also be used as cross-linkers but they also are less preferred as they tend to give films with poorer fastness properties.

For the purposes of the present invention the term "colorant" as used herein denotes perceptible and/or emissive materials. The term "perceptible material" as used herein includes all dyes and/or pigments and denotes materials which absorb radiation substantially in that part of the electromagnetic (EM) spectrum which encompass the infra red (IR); visible and/or ultraviolet (UV) regions, preferably in a region where the radiation wavelength [λ] is from about 200 nm to about 800 nm, more preferably in the visible region which is detectable by the normal, unaided human eye. The term "emissive material" as used herein denotes a material which is capable of emitting radiation, preferably EM radiation, more preferably radiation in the IR, visible and/or UV regions of the EM spectrum. Examples of emissive materials comprise fluorescent, phosphorescent and/or radioactive materials.

The dispersing groups in the precursor for the acrylic-polymer provide the facility of self-dispersibility and solubility to the precursor in ink media, especially in water. The dispersing groups may be ionic, non-ionic or a mixture of ionic and non-ionic dispersing groups. Preferred ionic dispersing groups include cationic quaternary ammonium groups and acid groups, for example phosphonic acid groups, sulphonic acid groups and carboxylic acid groups.

The dispersing groups may be incorporated into the precursor in the form of monomers or oligomers bearing the appropriate dispersing groups. One may also react a precursor which is not water-dissipatable, with monomers or oligomers which make the precursor water-dissipatable.

The acid groups may be subsequently fully or partially neutralised with a base containing a cationic charge to give a salt. If the acid dispersing groups are used in combination with a non-ionic dispersing group, neutralisation may not be required. The conversion of any free acid groups into the corresponding salt may be effected during the preparation of the precursor and/or during the preparation of an ink from the precursor.

Preferably the base used to neutralise any acid dispersing groups is ammonia, an amine or an inorganic base. Suitable amines are tertiary amines, for example triethylamine or triethanolamine. Suitable inorganic bases include alkaline hydroxides and carbonates, for example lithium hydroxide, sodium hydroxide, or potassium hydroxide. A quaternary ammonium hydroxide, for example $N^+(CH_3)_4OH^-$, can also be used. Generally a base is used which gives the required counter ion desired for an ink which is prepared from an acrylic polymer. For example, suitable counter ions include $Li^+$, $Na^+$, $K^+$, $NH_4^+$ and substituted ammonium salts.

Non-ionic dispersing groups may be in-chain, pendant or terminal groups. Preferably non-ionic dispersing groups are pendant polyoxyalkylene groups, more preferably polyoxyethylene groups. The non-ionic groups may be introduced into the precursor (which may itself be an acrylic polymer) in the form of a compound bearing non-ionic dispersing groups and at least one (although preferably only one) co-polymerisable olefinically unsaturated group.

The nature and level of dispersing groups in the precursor influences whether a solution, dispersion, emulsion or suspension is formed on dissipation of the precursor.

The dispersing group content of the precursor for the acrylic-polymer may vary within wide limits but is preferably sufficient to make the precursor form stable IJP inks in water and aqueous media. The precursor is preferably soluble in water, although minor amount of the precursor may be insoluble in water and exist as dissipated particles when mixed with aqueous media or water.

Preferably the proportion of insoluble, water-dissipatable precursor for the cross-linked acrylic polymer is less than 50%, preferably less than 40% and most preferably less than 30% by weight relative to the total weight of the precursor. The size of insoluble precursor particulates when dissipated in an ink is preferably less than 100 nm, and more preferably less than 60 nm.

Preferably the precursor for the cross-linked acrylic-polymer film coating is itself polymeric, more preferably it comprises one or more acrylic polymer(s).

A precursor which is polymeric may be prepared by polymerisation of:
  (a) olefinically unsaturated monomers providing dispersing groups in the presence of
  (b) olefinically unsaturated monomers which are free from dispersing groups.

It is preferred that the amount of (b) is from 0 to 95%, more preferably from 2 to 90% by weight relative to the weight of (a)+(b).

A precursor which is polymeric may be prepared in a conventional manner by polymerising the olefinically unsaturated monomers providing dispersing groups either alone or in the presence of olefinically unsaturated monomers which are free from dispersing groups. Temperatures of between 20° C. and 180° C. are preferred. The polymerisation may be continued until reaction between the monomers is complete.

In one embodiment used in the present invention a precursor which is polymeric may be prepared by polymerising an acrylic oligomer having water dispersing groups and one olefinically unsaturated terminal group in the presence of one or more olefinically unsaturated monomers which are free from water dispersing groups and/or olefinically unsaturated monomers having water dispersing groups. Alternatively an acrylic oligomer which is free from water dispersing groups may be polymerised in the presence of one or more olefinically unsaturated monomers having water dispersing groups.

Preferred polymerisation methods include solution polymerisation, emulsion polymerisation, suspension polymerisation and solution/dispersion polymerisation and such general methods are well known in the art.

If desired, an initiator may be used to assist formation of those precursor(s) which themselves are polymer [e.g. comprise acrylic polymer(s)]. Suitable initiators are free-radical generators. Examples of catalysts include azobis compounds, peroxides, hydroperoxides, redox catalysts, etc., for example, potassium persulphate, ammonium persulphate, tert-butyl peroctoate, benzoyl peroxide, isopropyl percarbonate, 2,4-dichlorobenzoyl peroxide, methyl ethyl ketone peroxide, cumene hydroperoxide, dicumyl peroxide, azobisisobutyronitrile, azobis(2-amidino-propane) hydrochloride and the like.

Typically 0.05 to 5% by weight of initiator is used relative to the total weight of the monomers. Preferably the polymerisation is performed in the presence of an emulsifying agent.

The $M_n$ of a precursor which is polymeric may be controlled by the addition of chain transfer agents and/or through the adjustment of the ratio of the concentration of monomers relative to the concentration of initiator during the course of the polymerisation. Typical chain transfer agents are thiols, halocarbons and cobalt macrocycles.

Preferred olefinically unsaturated monomers providing ionic dispersing groups include acrylic acid, methacrylic acid, itaconic acid, maleic acid, fumaric acid, pentadienoic acid, monoalkyl itaconates (for example, monomethyl maleate, monoethyl maleate, monobutyl maleate and monooctyl maleate), citraconic acid, styrene sulphonic acid, vinylbenzyl sulphonic acid, vinyl sulphonic acid, acryloyloxyalkyl sulphonic acids (for example, acryloyloxymethyl sulphonic acid, acryloyloxyethyl sulphonic acid, acryloyloxypropyl sulphonic acid and acryloyloxybutyl sulphonic acid), methacryloyloxyalkyl sulphonic acids (for example methacryloyloxymethyl sulphonic acid, methacryloyloxyethyl sulphonic acid, methacryloyloxypropyl sulphonic acid and methacryloyloxybutyl sulphonic acid), 2-acrylamido-2-alkylalkane sulphonic acids (for example, 2-acrylamido-2-methylethane sulphonic acid, 2-acrylamido-2-methylpropane sulphonic acid and 2-acrylamido-2-methylbutane sulphonic acid), 2-methacrylamido-2-alkylalkane sulphonic acids (for example, 2-methacrylamido-2-methylethane sulphonic acid, 2-methacrylamido-2-methylpropane sulphonic acid and 2-methacrylamido-2-methylbutane sulphonic acid), mono-(acryloyloxyalkyl) phosphates [for example, mono (acryloyloxyethyl) phosphate and mono(3-acryloyloxypropyl) phosphate] and mono (methacryloyloxyalkyl) phosphates [for example, mono (methacryloyloxyethyl) phosphate and mono(3-methacryloyloxypropyl) phosphate].

Preferred olefinically unsaturated monomers providing non-ionic dispersing groups include alkoxy polyethylene glycol (meth)acrylates, preferably having a number average molecular weight ($M_n$) of from 350 to 2000. Examples of such monomers which are commercially available include ω-methoxypolyethylene glycol acrylate (mean polymerisation degree of polyethylene glycol is about 9) and diethylene glycol vinyl ether.

Preferred olefinically unsaturated monomers which are free from dispersing groups include alkyl(meth)acrylates, optionally substituted styrenes, methacrylamides, allyl compounds, vinyl ethers, vinyl ketones, vinyl halides, olefins and unsaturated nitriles.

Preferred alkyl(meth)acrylates contain less than twenty carbon atoms. Examples include methyl acrylate, ethyl acrylate, n-propyl acrylate, isopropyl acrylate, n-butyl acrylate, isobutyl, sec-butyl acrylate, amyl acrylate, hexyl acrylate, 2-ethylhexyl acrylate, octyl acrylate, tert-octyl acrylate, 2-phenoxyethyl acrylate, 2-chloroethyl acrylate, 2-bromoethyl acrylate, 4-chlorobutyl acrylate, cyanoethyl acrylate, 2-acetoxyethyl acrylate, dimethylaminoethyl acrylate, benzyl acrylate, methoxybenzyl acrylate, 2-chlorocyclohexyl acrylate, acrylate, cyclohexyl acrylate, furfuryl acrylate, tetrahydrofurfuryl acrylate, phenyl acrylate, 5-hydroxypentyl acrylate, 2,2-dimethyl-3-hydroxypropyl acrylate, 2-methoxyethyl acrylate, 3-methoxybutyl acrylate, 2-ethoxyethyl acrylate, 2-iso-propoxyethyl acrylate, 2-butyoxyethyl acrylate, 2-(2-methoxyethoxy)ethyl acrylate, 2-(2-butoxyethoxy)ethyl acrylate, 1-bromo-2-methoxyethyl acrylate, 1,1-dichloro-2-ethoxyethyl acrylate, methyl methacrylate, ethyl methacrylate, n-propyl methacrylate, isopropyl methacrylate, n-butyl methacrylate, isobutyl methacrylate, sec-butyl methacrylate, amyl methacrylate, hexyl methacrylate, cyclohexyl methacrylate benzyl methacrylate, furfuryl methacrylate, 2-hydroxyethyl methacrylate, chlorobenzyl methacrylate, octyl methacrylate, N-ethyl-N-phenylaminoethyl methacrylate, 2-(3-phenylpropyloxy) ethyl methacrylate, dimethylaminophenoxyethyl methacrylate.

Preferred optionally substituted styrenes include styrene, methyl styrene, dimethyl styrene, trimethyl styrene, ethyl styrene, diethyl styrene, isopropyl styrene, butyl styrene, hexyl styrene, cyclohexyl styrene, decyl styrene, chloromethyl styrene, trifluoromethyl styrene, ethoxymethyl styrene, acetoxymethyl styrene, methoxy styrene, 4-methoxy-3-methyl styrene, dimethoxy styrene, chloro styrene, dichloro styrene, trichloro styrene, tetrachloro styrene, pentachloro styrene, bromo styrene, dibromo styrene, iodo styrene, trifluoro styrene and 2-bromo-4-tri-fluoromethyl styrene.

Preferred (meth)acrylamides contain less than 12 carbon atoms. Examples include methyl methacrylamide, tert-butyl methacrylamide, tert-octyl methacrylamide, benzyl methacrylamide, cyclohexyl methacrylamide, phenyl methacrylamide, dimethyl methacrylamide, dipropyl methacrylamide, hydroxyethyl-N-methylmethacrylamide, N-methylphenyl methacrylamide, N-ethyl-N-phenyl methacrylamide methacrylhydrazine and methylol methacrylamide.

Preferred allyl compounds include allyl acetate, allyl caproate, allyl caprylate, allyl laurate, allyl palmitate, allyl stearate, allyl benzoate, allyl acetoacetate, allyl lactate, allyl oxyethanol, allyl butyl ether and allyl phenyl ether.

Preferred vinyl ethers contain less than 20 carbon atoms. Examples include methyl vinyl ether, butyl vinyl ether, hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl vinyl ether, hydroxyethyl vinyl ether and dimethylaminoethyl vinyl ether.

Preferred vinyl ketones contain less than 12 carbon atoms. Examples include methyl vinyl ketone, phenyl vinyl ketone and methoxyethyl vinyl ketone.

Preferred vinyl halides include vinyl chloride, vinylidene chloride and chlorotrifluoro ethylene.

Preferred olefins includes unsaturated hydrocarbons having less than 20 carbon atoms. Examples include dicyclopentadiene, ethylene, propylene, 1-butene, 1-pentene, 1-hexene, 4-methyl-1-pentene, 1-heptene, 1-octene, 1-decene, 5-methyl-1-nonene, 5,5-dimethyl-1-octene, 4-methyl-1-hexene, 4,4-dimethyl-1-pentene, 5-methyl-1-hexene, 4-methyl-1-heptene, 5-methyl-1-heptene, 4,4-dimethyl-1-hexene, 5,5,6-trimethyl-1-heptene, 1-dodecene and 1-octadecene.

Preferred unsaturated nitriles include acrylonitrile and methacrylonitrile.

The preferred olefinically unsaturated monomers which are free from dispersing groups are the alkyl (meth)acrylates containing less than 20 carbon atoms, especially those specifically listed above.

The precursor of the present invention may be purified if desired in the usual way for colorants used in ink jet printing inks. For example a mixture of the precursor and water may be purified by ion-exchange, filtration, reverse osmosis, dialysis, freeze-drying, ultra-filtration or a combination thereof. In this way one may remove co-solvents used for the polymerisation, low molecular weight salts, impurities and free monomers.

In one optional aspect of the invention the colorant can be "resin reactive" that is be capable of forming a covalent bond with any group(s) of, or attached to, the precursor(s) or cross-linker(s). A colorant is resin reactive if it can bond covalently to the precursor and/or cross-linker either via one or more heterocyclic NH group(s) in a heterocyclic part of the colorant or via substituent groups attached to the colorant. The term "bonding covalently" will be understood to include both direct covalent bonds between the colorant and the precursor and/or cross-linker, as well as indirect attachments such as via optionally substituted alkyl or aryl groups. Thus preferred resin reactive colorant(s) comprise any heterocyclic NH group(s) or any substituent(s) capable of forming a covalent bond with substituents selected from —OH; —NH$_2$; —NHalkyl; —SH; —COOH, —COOalkyl; epoxy; —NHCOalkenyl; and —COalkenyl. The term heterocyclic NH group means an NH group in which the nitrogen atom forms part of a heterocyclic ring and which is capable of forming a covalent bond with an acrylic polymer. In the patterned substrate, a resin reactive colorant would be chemically bound within the cross-linked polymer matrix.

In another aspect of the invention the colorant is resin inactive, that is incapable of forming a covalent bond with the precursor and/or cross-linker. In the patterned substrate, a resin inactive colorant would be physically trapped within the spaces inside the cross-linked polymer matrix. Thus resin inactive colorants comprise all colorants which are other than the resin reactive colorants mentioned above, but otherwise effective for use in the process of the present invention. Preferred resin inactive colorants, would comprise those colorants which also do not exhibit the properties of the preferred resin reactive colorants also described above.

The colorants are preferably compatible with the resultant cross-linked acrylic-polymer coatings, i.e. the resultant cured films have high transparency. Preferably the colorant is insoluble in organic solvents and soluble in water, for example the colorant may contain sulpho or carboxy groups.

The colorant may be a single coloured component or a mixture of coloured components, for example it may be a mixture of different colorants. By using a mixture of different colorants, one may achieve greater flexibility in colour of the ink. Preferably to make a colour filter colorants are used individually or in mixtures to give yellow, magenta and cyan inks, more preferably to give red, blue and green inks.

Preferably for use in the process of the present invention the colorant(s) comprise dye(s). Dyes have advantages over pigments in that less dye is usually required than would be the case for a pigment, expensive milling is avoided, inks comprising dyes are less likely to form a precipitate on standing, a far greater variety of shades are available and the resultant films have good chroma and transparency.

In a preferred embodiment the colorant comprises dye(s) which are water soluble or soluble in organic solvents and insoluble in water (e.g. present as a dispersion, i.e. a disperse dye). More preferably the dye is water soluble to improve operability.

If a water insoluble dye is used, the dye is preferably present as a fine dispersion, prepared by for example milling the dye in water in a horizontal shaker in the presence of glass or metal beads and a dispersant. Suitable dispersants may comprise an anionic type (for example lignosulphonates and other sulphonated aromatic species) or a non-ionic type (for example alkylene oxide adducts).

Useful classes of colorants include azos (including metallised azos), anthraquinones, phthalocyanines, pyrrolines, thiophenedioxides, triphenodioxazines, methines, benzofuranones, benzodifuranones, coumarins, indoanilines, benzenoids, xanthenes, triphenylmethanes, nitros, nitrosonaphthols, phenzines, solvent soluble sulphur dyes, quinophthalones, pyridones, aminopyrazoles, pyrollidines, pyrroles, styrylics, maleimides, triphenazonaphthylamines, styryls, dithenes, azomethines, cyanines, pyrrolines and azoics.

The Colour Index International lists suitable water soluble dyes such as acid dyes, direct dyes, basic dyes and reactive dyes and further examples of acid dyes are given in the Color Index, 3rd Edition, Volume 1, pages 1003 to 1561, further examples of direct dyes are given in Volume 2, pages 2005 to 2478, further examples of basic dyes are given in Volume 1, pages 1611 to 1688 and further examples of reactive dyes are given in Volume 3 pages 3391 to 3560. These dyes are included herein by reference. Preferred dyes are selected from the monoazo, disazo, metallised azo, phthalocyanine, xanthene, triphenylmethane, anthraquinone, triphendioxazine, quinophthalone, maleimide, nitrosonaphthol dye classes. Examples of preferred dyes include: Acid Blue 9, Acid Red 1, Acid Red 37, Acid Red 52, Acid Red 289, Acid Yellow 3, Acid Yellow 23, Direct Blue 86, Direct Blue 87, Direct Blue 199, Direct Yellow 86, Reactive Blue 14 Reactive Blue 15 and Reactive Red 4.

Subject to the provisos herein, generally preferred colorants are those which have substituent groups which aid the solubility of the dye(s) in liquid media used in the process or which aid the solubility of the dye(s) in the final cross-linked polymer matrix.

The cross-linked polymeric film coating may be formed on a substrate to which the coating will bond, adhere, absorb or fuse. Suitable transparent substrates include glass; plastics films and plates such as those of polyvinylalcohol, polyester, polyvinylchloride, polyvinylfluoride, polycarbonate, polystyrene, polyamide or polyimide. The substrate may be flexible or may be a flat panel (e.g. as used in many LCD displays). A preferred substrate is glass.

The substrates may be pre-treated to improve bonding, adhesion, absorption, fusion or spreading of the cross-linked polymeric coating on the substrate. Suitable pre-treatments include plasma etching in which the substrate is placed in an oxygen atmosphere and subjected to an electrical discharge or application of an adhesion promoter such as a silane.

In the present process the cross-linking of the precursor(s) for the cross-linked acrylic-polymer(s) may be initiated thermally, chemically or photochemically, although thermal initiation is preferred.

The mixture of precursor(s) for the cross-linked acrylic polymer(s), cross-linker(s) and colorant(s) can be used to give patterned, transparent films and coatings on substrates in general, including substrates which are not transparent. Accordingly the present invention includes a process for preparing polymeric film coatings for substrates in general not just colour filters.

Chemical initiation may be achieved by addition of agents such as acids and tertiary amines.

Photochemical initiation may be achieved by addition of initiators for example azides, ketones such as acetophenone or benzophenone, ketals such as benzyldimethyl ketal, peroxides such as benzoyl peroxide or aryl sulphonium salts such as diphenyl-(4-phenylthio)-phenyl sulphonium tetrafluorophosphate, followed by irradiation with UV or visible light.

Thermally initiated cross-linking is preferably carried out at a temperature of between 100° C. and 250° C., more preferably between 120° C. and 240° C. and especially between 150° C. and 230° C. The films are cured for between 1 and 60 minutes, preferably for between 5 and 45 minutes.

Thermally initiated cross-linking is preferred since it is simpler than chemical or photochemical initiation as there is no need to add initiators and the like to the mixture.

According to a further feature of the present invention there is provided a composition comprising a mixture comprising one or more cross-linkable, thermally ink-jettable, water-dissipatable precursor(s) for cross-linked acrylic polymer(s); one or more cross-linker(s) capable of cross-linking the precursor(s); and one or more colorant(s). The precursor(s); cross-linker(s) and colorant(s) are as defined previously. Optionally the colorant is resin inactive.

The mixture of precursor(s); cross-linker(s) and colorant(s) used in the present process may further comprise one or more formulating agents, for example one or more liquid(s), humectant(s) and/or surfactant(s) may be added to the mixture to improve the solubility of colorant in the precursor(s) and vice versa, and to improve the flow and handling properties of the mixture. The liquid(s) may be aqueous or organic (for example as listed below).

Where a liquid(s) is added to the mixture the printed substrate may be dried by heating or by air drying at ambient temperature to evaporate the liquid before the coating is cured or during curing.

The mixture of precursor(s); cross-linker(s) and colorant(s) may comprise one or more pigments. Such pigments may be used in combination with dye(s) for shading purposes. Where the dye(s) is not significantly coloured, i.e. it is an IR or UV absorber as described above, the pigment may be the sole colorant.

In the process of the present invention the printing process used is IJP. However may be that any printing process other than IJP could also be used in this process, such a flexographic, off-set lithographic, gravure, intaglio printing, ink-jet, dye diffusion thermal transfer and screen printing processes. Preferably the printing process used is thermal IJP. It will be appreciated that although the precursors used in the present invention are thermally ink-jettable, this does not preclude their use in a non-thermal IJP process (such as piezo-electric IJP) where the printing conditions are less onerous on the precursor than in thermal ink-jet, or even in any suitable non-IJP printing process (such as those listed above). The principles and procedures for ink jet printing are described in the literature for example in High Technology Applications of Organic Colorants, P. Gregory, Chapter 9 ISBN 0-306-43637-X.

A process for preparing an colour filter according to the present invention may comprise several steps.

The first step comprises making an ink containing one or more cross-linkable, thermally ink-jettable, water-dissipatable precursor(s) for cross-linked acrylic polymer(s), one or more cross-linker(s) capable of cross-linking the precursor(s); one or more colorant(s), one or more solvents and optionally other formulating agents, by any method known in the art.

The second step comprises adding to the resultant preparation (as appropriate for chemically or photochemically initiated systems) either a radical source or a photopolymerisation initiator. An ink coloured in one of the desired colours can be produced, typically in the three primary additive colours of red, green and blue.

The third step comprises using the ink from step two to form a desired pattern consisting of a multiplicity of discrete filter regions (pixels) on a transparent substrate via a single pass ink-jet printing process. Optionally, the transparent substrate has previously been subdivided into discrete pixel regions by any method known in the art (for example formation of a black matrix by photolithography).

The fourth step comprises a curing step (for example heating, irradiating with UV radiation) on the patterned transparent substrate causing reaction of the precursor(s) and the cross-linker(s) contained in the pixels and thereby forming a continuous coloured film within each pixel of the optical filter.

The fifth step consists of an optional baking step to remove any residual solvents and other volatile species from the films. This particularly applies when the curing process in step four is other than heating.

The steps described above may be followed for each of the desired colours to form a multi-colour optical filter structure so that the filter structure finally comprises the transparent substrate and a single layer of differently coloured pixels arranged in triads or in any desired groups, each consisting of a predetermined number of differently coloured pixels.

However, it is preferable that the printing process employed achieves printing of all three primary colours simultaneously. More preferably, an IJP process is used to form triads or any desired groupings of pixels by using a printing head having appropriately designed outlets for the three coloured precursor/colorant mixtures. The colours of the trichromat can be additive (such as red green and blue [RGB]) or subtractive (such as cyan, magenta and yellow [YMC]). Colour filters of both types are possible. Colour filters of the YMC type give brighter images than RGB colour filters, but a poorer colour reproduction. They are useful in devices where maximum light utilisation is important, such as reflective type liquid crystal displays.

In a further aspect of the present invention there is provided an ink which is effective for use in ink jet printing, the ink comprising a fluid medium, one or more cross-linkable, water-dissipatable, precursor(s) for cross-linked acrylic polymer(s); one or more cross-linker(s) capable of cross-linking the precursor(s); and optionally one or more colorant(s) or other active agent(s) (preferably a dye). The precursor(s); cross-linker(s) and colorant(s) are as defined previously.

Preferably the ink of the present invention comprises from about 40 to about 99.6, preferably from about 70 to about 99.5, more preferably from about 75 to about 99, parts of the fluid medium; and from about 60 to about 0.4 parts, preferably from about 30 to about 0.5, more preferably from about 25 to about 1, parts of the precursor, cross-linker and colorant; where all parts are by weight and the number of parts totals 100.

Preferably the total concentration of solids in the mixture to be printed [e.g. an ink comprising precursor(s), cross-linker(s), colorant(s) and/or formulating agent(s)] is from about 4% to about 50%, more preferably from about 8% to about 30%, most preferably from about 10% to about 25% by total weight of the mixture, so the mixture is readily printable using a thermal IJP head, whilst also being capable of forming the film coating in a single IJP pass. The solids content may comprise either solely or mostly polymer(s) [e.g. those polymer(s) that may comprise the precursor(s)].

When the medium is a liquid, preferably the precursor, cross-linker and colorant are completely dissolved, and more preferably they have a solubility in the liquid media at 20° C. of at least 10%. This allows the preparation of concentrates which may be used to prepare more dilute inks and reduces the change of the precursor, cross-linker and/or colorant precipitating if evaporation of the liquid medium occurs during storage.

Preferred liquid media include water and a mixture of water and an organic solvent. When the medium comprises a mixture of water and an organic solvent, the weight ratio of water to organic solvent is preferably from about 99:1 to about 1:99, more preferably from about 99:1 to about 50:50 and especially from about 95:5 to about 80:20. The organic solvent is preferably water miscible.

When the liquid medium comprises water it may comprise one or more, preferably from 1 to 8, water miscible organic solvents.

Preferred water-miscible organic solvents may be selected from one or more:

$C_{1-6}$alkanols (such as methanol, ethanol, n-propanol, iso-propanol, n-butanol, sec-butanol, tert-butanol, iso-butanol n-pentanol, cyclopentanol, cyclohexanol and/or tetrahydrofurfuryl alcohol);

amides, for example linear amides (such as dimethylformamide and/or dimethylacetamide) or cyclic amides (such as optionally substituted pyrrolidones [e.g. 2-pyrrolidone, N-methyl-2-pyrrolidone, N-ethyl-2-pyrrolidone], caprolactam and/or 1,3-dimethylimidazolidone);

ketones and/or ketone alcohols (such as acetone, methyl ether ketone, cyclohexanone and/or diacetone alcohol);

water-miscible ethers, for example $C_{2-4}$ethers (such as tetrahydrofuran and/or dioxane);

alkylene glycols and/or thioglycols, for example those which comprise a $C_2$–$C_6$ alkylene group, [e.g. diols like $C_{2-12}$diols (such as pentane-1,5-diol, ethylene glycol, propylene glycol, butylene glycol, pentylene glycol, hexylene glycol and/or thiodiglycol)];

oligo- and/or poly-(alkyleneglycols and/or thioglycols), for example diethylene glycol, thiodiglycol, triethylene glycol, polyethylene glycol, polypropylene glycol and/or (polyols and triols) {such as glycerol and/or 1,2,6-hexanetriol};

lower alkyl glycol and/or polyglycol ethers, for example $C_{1-4}$alkyl ethers of diols, e.g. mono$C_{1-4}$alkyl ethers of $C_{2-12}$diols: [such as 2-methoxyethanol; 2-(2-methoxy ethoxy)ethanol; 2-(2-ethoxyethoxy)-ethanol; 2-(2- butoxyethoxy)ethanol; 3-butoxypropan-1-ol; 2-[2-(2-methoxyethoxy)ethoxy]ethanol; 2-[2-(2-ethoxyethoxy)-ethoxy] ethanol and/or ethyleneglycol monoallyl ether];

cyclic esters (such as caprolactone); and sulphoxides, (such as dimethyl sulphoxide and/or sulpholane).

More preferred water-soluble organic solvents are selected from: cyclic amides (e.g. 2-pyrrolidone, N-methyl-pyrrolidone and N-ethyl-pyrrolidone); diols, (e.g. 1,5-pentane diol, ethyleneglycol, thiodiglycol, diethyleneglycol and triethyleneglycol); $C_{1-6}$-alkyl mono ethers of $C_{2-6}$-alkylene glycols; $C_{1-4}$-alkyl ethers of diols (e.g. 2-methoxy-2-ethoxy-2-ethoxyethanol); $C_{1-6}$-alkyl mono ethers of poly ($C_{2-6}$-alkylene glycols); and mixtures thereof.

The inks according to a further aspect of the invention may be prepared by mixing the precursor, cross-linker, colorant, water and water-miscible organic solvent in any order. Suitable mixing techniques are well known in the art, for example agitation, ultrasonication or stirring of the components. The precursor may be present in the ink in any form suitable for IJP, for example the form of a dispersion, emulsification, suspension, solution or a combination thereof. Preferably the precursor is present as a solution.

The water-miscible solvent preferably has a solubility in water at 20° C. of more than 50 g/l.

Examples of further IJP-effective media for inks of the present invention comprising a mixture of water and one or more organic solvents are described in U.S. Pat. No. 4,963,189, U.S. Pat. No. 4,703,113, U.S. Pat. No. 4,626,284 and EP 0425150-A.

The amount of colorant, cross-linker and water-dissipatable precursor contained in a liquid ink of the present invention will vary according to the depth of shade and properties required on the substrate. Typically, however, such an ink may comprise the following ingredients (where all amounts by part are the relative proportions of each ingredient by their weight):

(a) from about 0.2 to about 50 parts, more preferably from about 0.5 to about 30 parts, most preferably from about 2 to about 25 parts, especially from about 5 to about 20 parts; e.g. from about 8 to about 15 parts; of a water-dissipatable precursor which is polymeric (preferably having a number average molecular weight less than about 20,000);

(b) from about 0.1 to about 30 parts, more preferably from about 0.5 to about 25 parts, most preferably from about 0.5 to about 15 parts, especially from about 0.5 to about 10 parts; for example from about 2 to about 8 parts; of colorant;

(c) from about 0.1 to about 30 parts, more preferably from about 0.5 to about 15 parts of cross-linker;

(d) from about 40 to about 90 parts, more preferably from about 50 to about 90 parts of water; and (e) from about 0 to about 60 parts, more preferably about 0 to about 40 parts, most preferably from about 0 to about 25 parts, especially from about 0 to about 20 parts of a water-miscible organic solvent;

The water-miscible organic solvent, mentioned in (e) above and optionally present in these inks may each comprise a mixture of organic solvents (such as one or more of those described previously).

Preferably the water miscible component "(e)" in the inks of the present invention may comprise from about 50% to about 100% (by weight) of a water-miscible solvent comprising:

(1) a cyclic ester and/or cyclic amide, more preferably an optionally substituted pyrrolidone, [such as, 2-pyrrolidone, dimethyl pyrrolidone, N-methyl-2-pyrrolidone, N-ethyl-2-pyrrolidone,N-(2-hydroxyethyl)-2-pyrrolidone and/or mixtures thereof];

(2) a water-miscible $C_{1-6}$-alkyl mono ether of a $C_{2-6}$-alkylene glycol and/or $C_{1-6}$-alkyl mono ether of poly ($C_{2-6}$-alkylene glycol); and/or (3) any mixtures of (1) and (2).

The number of parts of the water-dissipatable precursor (e.g. an acrylic polymer) is calculated on a 100% solids basis. For example 50 g of a 20% solids acrylic polymer is taken as 10 g of acrylic polymer.

The inks of the present invention may also contain additional components conventionally used in inks for IJP. Thus for example the ink may comprise one or more: rheological agent(s) [such as viscosity modifier(s) and/or surface tension modifier(s), for example wax(es) (e.g. beeswax) and/or clay(s) (e.g. bentonite)]; corrosion inhibitor (s), biocides (such as those available commercially from Zeneca Limited under the trade name Proxel GXL or from Rohm and Haas under the trade name Kathon); fungicide(s); kogation reducing additives; IR absorber(s) (such as that available commercially from Zeneca Limited under the trade name Projet 900NP); fluorescent brightener(s), (such as C.I. Fluorescent Brightener 179); and surfactant(s) (which may be ionic or non-ionic and include surface active agent(s) wetting agent(s) and/or emulsifier(s) such as those described in McCutcheon's Emulsifiers and Detergents 1996 International Edition or in Surfactants Europa $3^{rd}$ Edition 1996 each of which is incorporated herein by reference).

The ink preferably has a pH from 3 to 12, more preferably from 4 to 11. The pH selected will depend to some extent on the desired cation for the colorant and the materials used to construct the ink jet printer head. The desired pH may be obtained by the addition of a pH adjusting agent such as an acid, base or pH buffer. The amount of pH adjuster used will vary according to the desired pH of the ink, but typically a base may be present in an amount of up to 30%. Where a base is used this is preferably the same base as was used to neutralise the anionic dispersing group during the preparation of the acrylic polymer. Preferred bases comprises 2-amino-2-methylpropan-1-ol and ammonia.

The ink may also comprise radical scavengers and/or UV absorbers to help improve light and heat fastness of the ink and resultant colour filter. Examples of such additives include: 2-hydroxy-4-methoxy-5-sulfobenzophenone; hydroxy phenylbenzotriazole; 4-hydroxy-TEMPO and transition metal complexes (such as nickel complexes of thiocarbamic acids). These additives are used typically in an amount from 30% to 60% by weight of the colorant, and are further described in "The Effect of Additives on the Photo-stability of Dyed Polymers", Dyes and Pigments, 1997, 33(3), 173–196 and JP-A-04-240603 (Nippon Kayaku).

The viscosity of an ink of the present invention is preferably less than 20 cp, more preferably less than 15 cp, especially less than 10 cp, at 20° C.

The inks of the present invention have the advantage that they not only offer improved operability in piezoelectric ink-jet printers, but are also suitable for use in thermal ink jet printers as they have a low tendency to block the nozzles of thermal ink jet printers. This is particularly difficult to achieve for inks that contain polymers. The prior art inks that contain water dispersible polymers work poorly or even not at all in thermal ink-jet printers.

A further aspect of the invention provides a process for printing an image on a substrate comprising applying thereto an ink according to the first aspect of the present invention by means of an ink jet printer.

The ink jet printer preferably applies the ink to the substrate in the form of droplets which are ejected through a small nozzle onto the substrate. Preferred ink jet printers are piezoelectric ink jet printers and thermal ink jet printers. In thermal ink jet printers, programmed pulses of heat are applied to the ink in a reservoir (e.g. by means of a resistor adjacent to the nozzle) thereby causing the ink to be ejected in the form of small droplets directed towards the substrate during relative movement between the substrate and the nozzle. In piezoelectric ink jet printers the oscillation of a small crystal causes ejection of the ink from the nozzle. The term ink-jet printer denotes any device which could use an IJP technique to produce an image.

A further aspect of the present invention provides a substrate which has applied thereon an ink of the present invention as defined herein and/or which has been prepared by the process of the present invention also as defined herein.

The substrate, which is optionally transparent, preferably comprises plastic or metal or glass, more preferably glass. Preferably the ink of the present invention has been applied to the substrate by a printing process, more preferably the process of the present invention as defined herein.

According to a further feature of this invention there is provided a colour filter comprising red, green and blue filter elements, or yellow, magenta and cyan filter elements, and comprising a coloured cross-linked polymeric coating on a transparent substrate prepared by the process described in the present invention.

A further feature of the invention comprises a display containing a colour filter prepared according to the present invention.

A further feature of the present invention is a cartridge suitable for use in an ink jet printer containing an ink according to the invention. Also there is provided an ink jet printer containing an ink according to the invention.

The invention will now be described by example only. All parts and percentages are by weight unless specified otherwise. In the examples (and previously), compounds referred to by reference to CI numbers are the dyestuffs identified by these numbers in the Colour Index International, 3$^{rd}$ Edition, 3$^{rd}$ Revision. In each of the following Examples, the inks were tested and the results were set out in tables.

The result given in the second column headed $\Delta E_{ab}$ is a measure of the change in L*.a*.b* co-ordinates (as measured with a Minolta CR-221 chromameter) after the Example had been treated as described in the first column, where low figures indicate an Example with high fastness.

In the first column, the test denoted as "Xe light fastness" signifies that the $\Delta E_{ab}$ result was obtained after exposure of the Example to a Xenon lamp over 100 hours in a Atlas Ci35A Weatherometer at the following settings: lamp power 0.80 Wm$^{-2}$ at 420 nm, black panel 63° C. and wet bulb depression 16° C.

Each of the following Examples were tested for operability in a thermal ink-jet head as follows. The ink was charged into a Canon BC-21e head, and 10 cm×2 cm blocks of solid colour were printed using a Canon BJC 4300 printer. With each of the exemplified inks, 20 blocks could be printed continuously without any deterioration in print quality.

EXAMPLE 1

An ink was made with the following formulation (all parts by weight):

| | |
|---|---|
| Polymer A[1] | 12.1 parts |
| Primid XL552 (from EMS Chemie)[2] | 4.0 parts |

-continued

| | |
|---|---|
| Ammonia (0.88 specific gravity, S.G.) | 12.1 parts |
| Dye 1[3] | 0.4 parts |
| Dye 2[4] | 2.8 parts |
| Ammonium dodecylbenzenesulphonate | 0.4 parts |
| Water | 68.2 parts |

Legend (Ex. 1)

1. Polymer A is a copolymer comprising 70 wt % methacrylic acid and 30 wt % methyl methacrylate prepared by a catalytic chain transfer method to give a polymer with $M_w$=1401 ($M_n$=588) as measured by GPC.
2. Primid XL 552 is a polyol cross-linking agent.
3. Dye 1 has the following structure:

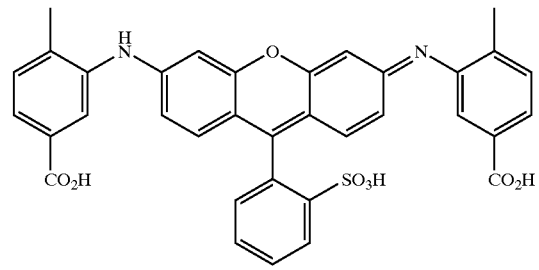

Dye 1 is synthesised in Example 3 of EP-A-0542420 (ICI/Zeneca).

4. Dye 2 has the following structure:

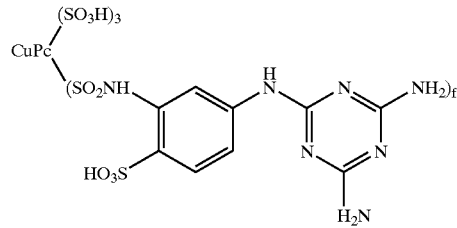

Dye 2 was synthesised by condensing C.I. Reactive Blue 15 (available commercially from Aldrich Chemical Co.) with excess ammonia at 70° C. in an analogous manner to that described in JP-A-60-208365 (Nippon Kayaku).

For the purposes of testing the film fastness properties, the above ink was coated on to microscope slides using a No.1 K-bar (RK Print-Coat Instruments Ltd.), and the slides cured at 200° C. for 15 minutes. The resultant films had a thickness of approximately 1.5 μm.

The ink gave bright blue films with 77% transmission at 450 nm. The films were subjected to the following fastness tests:

| Test | $\Delta E_{ab}$ |
|---|---|
| 230° C. for 45 minutes | 3.2 |
| Dip in N-methyl pyrrolidone for 5 minutes | 2.5 |
| Sonicate in water at 60° C. for 60 minutes; 700 W | 0.4 |
| Xe light fastness | 2.0 |

EXAMPLE 2

An ink was made with the following formulation (all parts by weight):

| | |
|---|---|
| Direct Yellow 86 | 2.8 parts |
| Poly(acrylic acid) average $M_w$ 2000 (from Aldrich Chem. Co.) | 13.9 parts |
| Primid XL552 (from EMS Chemie) | 4.6 parts |
| 2-Amino-2-methyl-1-propanol | 4.6 parts |
| Ammonia (0.88 S.G.) | 7.4 parts |
| Water | 66.7 parts |

For the purposes of testing the film fastness properties, the ink was coated on to microscope slides using a No.1 K-bar (RK Print-Coat Instruments Ltd.), and the slides cured at 200° C. for 15 minutes. The resultant films had a thickness of approximately 1.5 μm.

The ink gave bright yellow films with 99% transmission at 600 nm and 0% transmission at 400 nm. The films were subjected to the following tests:

| Test | $\Delta E_{ab}$ |
|---|---|
| 200° C. for 45 minutes | 1.2 |
| 230° C. for 45 minutes | 4.4 |
| Dip in N-methyl pyrrolidone for 5 minutes, then heat at 230° C. for 10 minutes | 3.2 |
| Sonicate in water at 60° C./700 W for 3 mins. | 0.8 |
| Xe light fastness | 13.4 |

EXAMPLE 3

An ink was made with the following formulation (all parts by weight):

| | |
|---|---|
| Acid Red 52 | 2 parts |
| Acid Yellow 23 | 3 parts |
| Poly(acrylic acid) average $M_w$ 2000 (from Aldrich Chem. Co.) | 14.7 parts |
| Primid XL552 (from EMS Chemie) | 4.9 parts |
| 2-Amino-2-methyl-1-propanol | 4.9 parts |
| Water | 70.5 parts |

For the purposes of testing the film fastness properties, the ink was coated on to microscope slides using a No.1 K-bar (RK Print-Coat Instruments Ltd.), and the slides cured at 200° C. for 15 minutes. The resultant films had a thickness of approximately 1.5 μm.

The ink gave very bright red films with 98% transmission at 640 nm and 0% transmission at 550 nm and 450 nm. The films were subjected to the following fastness tests:

| Test | $\Delta E_{ab}$ |
|---|---|
| 200° C. for 45 minutes | 2.5 |
| 230° C. for 45 minutes | 6.9 |
| Dip in N-methyl pyrrolidone for 5 minutes, then heat at 230° C. for 10 minutes | 5.9 |
| Dip in water at 30° C. for 5 minutes | 0.3 |
| Xe light fastness | 5.1 |

Comparative Example A

An ink was made with following formulation in a similar method to that described in EP-A-0764290 (Zeneca), (all parts by weight):

| | |
|---|---|
| Neocryl XK69/Cymel 327 stock polymer precursor[5] | 50 parts |
| Ethylene glycol | 20 parts |
| Distilled water | 23 parts |
| Ammonia solution (0.88 S.G.) | 2 parts |
| Acid Yellow 23 | 3 parts |
| Acid Red 52 | 2 parts |

Legend (Comp. Ex. A)

5. The stock polymer precursor was prepared as described in Example 3 of EP-A-0764290, where Neocryl XK69 is a styryl-(meth)acrylate co-polymer; and Cymel 327 is a melamine-formaldehyde condensate included as a cross-linking agent.

When tested for operability in a thermal head as described previously, this ink (which comprises a total of about 5% by weight of melamine-formaldehyde resin) failed to print a single block of colour.

EXAMPLE 4

An ink was made with the following formulation (all parts by weight):

| | |
|---|---|
| Polymer B[6] | 12.7 parts |
| Primid XL552 (from EMS Chemie) | 4.2 parts |
| 2-Amino-2-methyl-1-propanol | 12.7 parts |
| Acid Red 289 | 1.7 parts |
| Acid Yellow 23 | 3.4 parts |
| 4-Hydroxy TEMPO | 1.5 parts |
| Ammonium dodecylbenzenesulphonate | 0.8 parts |
| Water | 63 parts |

Legend (Ex. 4)

6. Polymer B is a copolymer comprising (by weight) 46.4% methacrylic acid and 53.6% methyl methacrylate prepared by a catalytic chain transfer method to give a polymer with $M_w$=1607 ($M_n$=670) as measured by GPC.

For the purposes of testing the film fastness properties, the ink was coated on to microscope slides using a No.1 K-bar (RK Print-Coat Instruments Ltd.), and the slides cured at 200° C. for 15 minutes. The resultant films had a thickness of approximately 1.5 μm.

The ink gave very bright red films with 91% transmission at 620 nm and 1% transmission at 550 nm and 450 nm. The films were subjected to the following tests:

| Test | $\Delta E_{ab}$ |
|---|---|
| 230° C. for 45 minutes | 3.2 |
| Dip in N-methyl pyrrolidone for 5 minutes | 1.7 |
| Sonicate in water at 60° C. for 60 minutes; 700 W | 3.2 |
| Xe light fastness | 4.2 |

Inks

Further inks which are suitable for making colour filters may be prepared having the formulations described in tables below where the numbers denote parts by weight of each ingredient in the formulation. The dyes used may be in their free acid form and/or in the form of any IJP-effective salt. The following abbreviations are also used in the tables:

DB199 = Direct Blue 199
DB86 = Direct Blue 86
DB87 = Direct Blue 87
AB9 = Acid Blue 9
RB15 = Reactive Blue 15
AR1 = Acid Red 1
AR52 = Acid Red 52
AR289 = Acid Red 289
RR4 = Reactive Red 4
AY23 = Acid Yellow 23
DY86 = Direct Yellow 86
Dye 1 = Dye 1 of Ex. 1
A = Polymer A of Ex. 1
B = Polymer B of Ex. 4
PAA = Poly(acrylic acid) of $M_w$ 2000
X = Primid XL552
TEA = Triethanolamine
TMP = Trimethylolpropane
W = Water
NMP = N-methyl-2-pyrrolidone
2P = 2-pyrrolidone
BE = Butoxyethanol
DEG = Diethylene glycol
GBL = γ-butyrolactone.
ADBS = Ammonium dodecylbenzene sulphonate
SDBS = Sodium dodecylbenzene sulphonate
SURF = Surfynol 465 (Non-ionic surfactant available from Air Products)
AMP = 2-Amino-2-methyl-1-propanol
AM = Ammonia (0.88 S.G.)
HT = 4-Hydroxy-TEMPO; and
HMBS = 2-Hydroxy-4-methoxy-5-sulfobenzophenone.

TABLE I

| DB199 | DB56 | AR52 | AR289 | A | X | W | BE | ADBS | AMP | AM |
|---|---|---|---|---|---|---|---|---|---|---|
| 3 | | 0.5 | | 15 | 5.5 | 60 | | 1 | 15 | |
| | 3 | 0.25 | | 12 | 4 | 69.25 | 5 | 0.5 | | 6 |
| 3 | | | 1 | 12 | 6 | 62 | 5 | 1 | | 10 |
| 2 | | 0.2 | | 4 | 1 | 88.8 | | 1 | 3 | |
| | 4 | | 0.5 | 10 | 2 | 74.5 | 2 | | | 7 |
| 3.5 | | | 0.3 | 12.5 | 4 | 61.4 | 5 | 0.8 | 12.5 | |
| | 2.5 | | | 8 | 2 | 80.5 | 2 | | 5 | |
| | | 3 | | 11.5 | 6.5 | 63 | 5 | | | 11 |
| | | 0.5 | 3 | 13.7 | 4.3 | 63.8 | | 0.7 | 14 | |
| 3 | | | | 15 | 5 | 61 | | 1 | | 15 |

TABLE II

| DB199 | AR289 | A | B | PAA | X | TEA | TMP | W | 2P | ADBS | AM |
|---|---|---|---|---|---|---|---|---|---|---|---|
| 4 | 0.5 | 14 | | | 5 | | | 61.5 | | 1 | 14 |
| 4 | 0.5 | | 10.5 | | 2.5 | | | 70 | 4 | 0.5 | 8 |
| 3.5 | 0.25 | 3 | | 12 | | 5 | | 60.5 | | 0.75 | 15 |
| 3 | | | | 12 | | | 3 | 67 | 5 | | 10 |
| | 2.5 | 12 | | | 2 | | 2 | 76 | | 0.5 | 5 |
| 1 | | | 4 | 4 | 5 | | | 81 | 1 | | 4 |
| 3 | 0.1 | | 15 | | | 5 | | 63 | | 0.9 | 13 |

TABLE III

| DB199 | AR289 | B | TMP | W | 2P | DEG | GBL | SURF | SDBS | AMP |
|---|---|---|---|---|---|---|---|---|---|---|
| 4 | 0.5 | 16 | 4 | 54.5 | | | 5 | 1 | | 15 |
| | 3 | 12 | 3 | 71.2 | | | | | 0.8 | 10 |
| 2 | 3 | 14 | 7 | 49 | 5 | 5 | | | | 15 |
| 1 | 0.1 | 4 | 1 | 87.4 | 0.5 | | 1.5 | 0.5 | | 4 |
| 2 | | 8 | 3 | 80.5 | | 2 | | | 0.5 | 4 |

TABLE IV

| AR1 | RR4 | AY23 | DY86 | B | X | W | DEG | SURF | AMP | AM |
|---|---|---|---|---|---|---|---|---|---|---|
| 2 | | 3 | | 10 | 5 | 69 | | 1 | | 10 |
| 1.5 | | | 3 | 14.5 | 5 | 62.5 | 3 | 0.5 | 10 | |
| | 5 | | | 18 | 7 | 50 | 5 | | 15 | |
| 1 | 1 | 3 | | 12 | 4 | 64.5 | 2 | 0.5 | | 12 |
| | 2.5 | | 2.5 | 15 | 7.5 | 56.5 | | 1 | 15 | |
| | | 3 | | 10 | 5 | 74.2 | | 0.8 | | 7 |
| 4 | | | | 10 | 3.5 | 67.5 | 5 | | | 10 |
| | 4 | 1 | 1 | 15 | 5 | 63.3 | | 0.7 | 10 | |

TABLE V

| AB9 | RB15 | AY23 | A | PAA | X | W | BE | GBL | SURF | SDBS | AM |
|---|---|---|---|---|---|---|---|---|---|---|---|
| 2 |  | 5 | 13 |  | 4 | 55.2 | 5 |  |  | 0.8 | 15 |
|  | 2 | 3 | 15 |  | 5 | 59 |  | 5 |  | 1 | 10 |
|  |  | 3 | 8 |  | 4 | 74.5 | 2.5 | 2.5 | 0.5 |  | 5 |
| 2.5 |  |  |  | 10 | 3 | 69.5 | 4 |  | 0.5 | 0.5 | 10 |
|  | 2 | 2 | 5 | 10 | 7.5 | 52.5 |  |  |  | 1 | 20 |

TABLE VI

| DB87 | AR52 | DYE 1 | A | X | W | HT | HMSB | ADBS | AM |
|---|---|---|---|---|---|---|---|---|---|
| 3.5 |  | 0.25 | 13.5 | 4 | 63.5 | 1.75 |  | 0.5 | 14 |
|  | 3 |  | 15 | 5 | 60 | 1 |  | 1 | 15 |
| 4 | 0.5 |  | 12 | 6 | 65.5 |  |  |  | 12 |
| 5 | 0.25 |  | 12 | 5 | 66.9 |  |  | 0.85 | 10 |
|  |  | 2.5 | 12.5 | 4 | 68 |  | 1 |  | 12 |
|  | 2.5 |  | 15 | 4.5 | 65.5 | 1 | 0.5 | 1 | 10 |
| 3 |  | 0.3 | 12 | 4 | 67.8 |  |  | 0.9 | 12 |

TABLE VII

| AR1 | A | B | X | TEA | W | HT | HMSB | NMP | BE | ADBS | AM |
|---|---|---|---|---|---|---|---|---|---|---|---|
| 4 | 15 |  | 5 |  | 53.5 | 2 |  | 5 |  | 0.5 | 15 |
| 5 | 6 | 6 |  | 5 | 64 | 1 | 1 |  | 2 |  | 10 |
| 5 | 12 |  | 2 | 2 | 64 |  | 2.5 | 2 | 2 | 0.5 | 8 |
| 2.5 |  | 13 | 4.5 |  | 63.5 | 1.5 |  |  |  | 1 | 14 |

What is claimed is:

1. A process for preparing a patterned, cross-linked, acrylic-polymer, film coating on a substrate; the process comprising:
   a) applying to the substrate by an ink-jet printing process a mixture comprising
      i) one or more cross-linkable, thermally ink-jettable, water-dissipatable, precursor(s) for one or more cross-linked, acrylic-polymer(s);
      ii) one or more cross-linker(s) capable of cross-linking the precursor(s) for the acrylic-polymer(s), where the cross-linker(s) is other than an epoxy resin and comprises one or more; polyol(s) comprising three or more hydroxy groups; trimethylolpropane; and/or triethanolamine; and
      iii) one or more resin inactive colorant(s); and
   b) thereafter curing the mixture in situ to form the patterned, cross-linked, acrylic-polymer, film coating on the substrate.

2. An ink-jet printing process as claimed in claim 1, which is a thermal ink-jet printing process.

3. A printing process as claimed in claim 1 or claim 2, in which the mixture is applied by the printing process in a single pass.

4. A process as claimed in claim 1 or 2, where the precursor(s) comprises one or more polymer(s) having a number average molecular weight ($M_n$) of less than about 20,000.

5. A process as claimed in claim 4, where $M_n$ of the precursor(s) is from about 200 to about 20,000.

6. A process as claimed in claim 5, where $M_n$ of the precursor(s) is from about 200 to about 10,000.

7. A process as claimed in claim 6, where $M_n$ of the precursor(s) is from about 350 to about 2,000.

8. A process as claimed in claim 1 or 2, where the total concentration of solids in the mixture to be printed is from about 4% to about 50% by weight.

9. A process as claimed in claim 1 or 2, where the precursor(s) for the acrylic-polymer(s) comprises one or more polymer(s).

10. A process as claimed in claim 1 or 2, where the thermally ink-jettable, precursor(s) comprises one or more olefinically unsaturated, water-dissipatable monomer(s) and/or one or more polymer(s) derivable from one or more olefinically unsaturated, water-dissipatable monomer(s), the monomer(s) and/or polymer(s) optionally present in amount from about 20% to about 100% by weight of the precursor(s).

11. A process as claimed in claim 1 or 2, where the precursor(s) comprises one or more:
   a) homopolymers and/or copolymers of: (meth)acrylic acid, vinyl acetic acid, crotonic acid, itaconic acid, maleic acid, citraconic acid, fumaric acid and/or pentadienoic acid;
   b) co-polymers of the monomers listed in (a) with other monomers, optionally selected from one or more of alkyl(meth)acrylate, styrene and (meth)acrylamides; and/or
   c) monomeric poly carboxylic acids.

12. A process as claimed in claim 11, where the monomeric poly carboxylic acids comprise at least butane 1,2,3,4-tetracarboxylic acid.

13. A process as claimed in claim 1 or 2, where the mixture of precursor(s) and cross-linker(s) is thermally curable.

14. A process as claimed in claim 1 or 2, where the colorant(s) are selected from the group consisting of: azos, anthraquinones, phthalocyanines, pyrrolines, thiophenedioxides, triphenodioxazines, methines, benzofuranones, benzodifuranones, coumarins, indoanilines, benzenoids, xanthenes, triphenylmethanes, nitros, nitrosonaphthols, phenazines, solvent soluble sulphur dyes, quinophthalones, pyridones, aminopyrazoles, pyrollidines, pyrroles, styrylics, maleimides, triphenazonaphthylamines, styryls, dithienes, azomethines, cyanines, pyrrolines and azoics.

15. A substrate obtained by a process as claimed in claim 1.

16. A substrate as claimed in claim 15, which comprises: a colour filter comprising a coloured, cross-linked, acrylic-polymer coating on a transparent substrate; and/or a transparent, coloured, cross-linked, acrylic-polymer coating on a substrate.

17. A substrate as claimed in claim 15, which has a utility as a component for a coloured display.

18. A substrate as claimed in claim 15, which comprises an array of coloured trichromatic elements in which the trichromat is selected from the group consisting of: red, green and blue trichromat; and a cyan, magenta and yellow trichromat.

19. A display which comprises a substrate as claimed in claim 15.

20. A display as claimed in claim 19, which comprises a liquid crystal display.

21. A process as claimed in claim 1, wherein the colorant comprises metallized azo.

22. A process as claimed in claim 1, where the precursor(s) for the acrylic polymer(s) comprises one or more acrylic polymers.

23. A process as claimed in claim 1, wherein the one or more cross-linkers comprise N,N,N',N'-tetrakis(2-hydroxyethyl)adipamide.

24. A process as claimed in claim 1, wherein the one or more cross-linkers comprise trimethylolpropane, triethanolamine or a mixture thereof.

25. A process as claimed in claim 1, wherein the one or more cross-linkers comprise N,N,N',N'-tetrakis(2-hydroxyethyl) adipamide and one or both of trimethylolpropane and triethanolamine.

26. A composition capable of being used in an ink jet printing process, the composition comprising one or more cross-linkable, thermally ink-jettable water-dissipatable precursor(s) for one or more cross-linked acrylic polymer(s); one or more cross-linker(s) capable of cross-linking the precursor(s) where the cross-linker(s) is other than an epoxy resin and comprises one or more; polyol(s) comprising three or more hydroxy groups; trimethylolpropane; and/or triethanolamine; and one or more resin inactive colorant(s).

27. A composition as claimed in claim 26, wherein the one or more cross-linkers comprise N,N,N',N'-tetrakis(2-hydroxyethyl) adipamide.

28. A composition as claimed in claim 26, wherein the one or more cross-linkers comprise trimethylolpropane, triethanolamine or a mixture thereof.

29. A composition as claimed in claim 26, wherein the one or more cross-linkers comprise N,N,N',N'-tetrakis(2-hydroxyethyl) adipamide and one or both of trimethylolpropane and triethanolamine.

30. An ink which is effective for use in an ink jet printing process, the ink comprising a fluid medium and a composition comprising one or more cross-linkable, thermally ink-jettable water-dissipatable precursor(s) for one or more cross-linked acrylic polymer(s); one or more cross-linker(s) capable of cross-linking the precursor(s) where the cross-linker(s) is other than an epoxy resin and comprises one or more: polyol(s) comprising three or more hydroxy groups; trimethylolpropane; and/or triethanolamine; and one or more resin inactive colorant(s).

31. An ink as claimed in claim 30, which comprises:
(a) from about 0.2 to about 50 parts by weight of the thermally ink-jettable, water-dissipatable cross-linkable precursor(s) for the one or more cross-linked acrylic polymer(s);
(b) from about 0.1 to about 30 parts by weight of the colorant(s);
(c) from about 0.1 to about 30 parts by weight of the cross-linker(s) capable of cross-linking the precursor(s);
(d) from about 40 to about 90 parts by weight of water; and
(e) from about 0 to about 60 parts by weight of a water-miscible organic solvent.

32. An ink as claimed in claim 31, which comprises:
(a) from about 0.5 to about 30 parts by weight of the precursor(s);
(b) from about 0.5 to about 25 parts by weight of the colorant(s);
(c) from about 0.5 to about 15 parts by weight of the cross-linker(s);
(d) from about 50 to about 90 parts by weight of water; and/or
(e) from about 0 to about 40 parts by weight of the organic solvent.

33. An ink as claimed in claim 30, wherein the one or more cross-linkers comprise N,N,N',N'-tetrakis(2-hydroxyethyl) adipamide.

34. An ink as claimed in claim 30, wherein the one or more cross-linkers comprise trimethylolpropane, triethanolamine or a mixture thereof.

35. An ink as claimed in claim 30, wherein the one or more cross-linkers comprise N,N,N',N'-tetrakis(2-hydroxyethyl) adipamide and one or both of trimethylolpropane and triethanolamine.

36. An ink jet printer which comprises a composition comprising one or more cross-linkable, thermally ink-jettable water-dissipatable precursor(s) for one or more cross-linked acrylic polymer(s); one or more cross-linker(s) capable of cross-linking the precursor(s) where the cross-linker(s) is other than an epoxy resin and comprises one or more: polyol(s) comprising three or more hydroxy groups; trimethylolpropane; and/or triethanolamine; and one or more resin inactive colorant(s).

37. An ink-jet printer consumable comprising a composition comprising one or more cross-linkable, thermally ink-jettable water-dissipatable precursor(s) for one or more cross-linked acrylic polymer(s); one or more cross-linker(s) capable of cross-linking the precursor(s) where the cross-linker(s) is other than an epoxy resin and comprises one or more: polyol(s) comprising three or more hydroxy groups; trimethylolpropane; and/or triethanolamine; and one or more resin inactive colorant(s).

* * * * *